(12) United States Patent
Thorburn et al.

(10) Patent No.: US 7,002,137 B2
(45) Date of Patent: Feb. 21, 2006

(54) REFERENCE POINT TALBOT ENCODER

(75) Inventors: William G. Thorburn, Whitinsville, MA (US); Norman J. Tobey, Bedford, MA (US); Melvin J. J. Teare, Ashland, MA (US); Douglas A. Klingbeil, Niwot, CO (US); Ralph A. Kelliher, Newton, MA (US)

(73) Assignee: GSI Lumonics Corporation, Northville, MI (US)

( * ) Notice: Subject to any disclaimer, the term of this patent is extended or adjusted under 35 U.S.C. 154(b) by 42 days.

(21) Appl. No.: 10/217,756

(22) Filed: Aug. 13, 2002

(65) Prior Publication Data

US 2003/0047674 A1 Mar. 13, 2003

Related U.S. Application Data

(60) Provisional application No. 60/316,160, filed on Aug. 30, 2001, provisional application No. 60/316,121, filed on Aug. 30, 2001.

(51) Int. Cl.
*G01D 5/34* (2006.01)

(52) U.S. Cl. .................................. 250/231.13

(58) Field of Classification Search .............. 250/231.13–231.19, 237 G; 356/614–619
See application file for complete search history.

(56) References Cited

U.S. PATENT DOCUMENTS

| | | | |
|---|---|---|---|
| 4,677,293 A | 6/1987 | Michel | 250/237 |
| 5,073,710 A | 12/1991 | Takagi et al. | 250/231.14 |
| 5,260,568 A * | 11/1993 | Ieki | 250/231.18 |
| 5,428,445 A | 6/1995 | Holzapfel | 356/356 |
| 5,534,693 A | 7/1996 | Kondo et al. | 250/237 G |
| 5,559,600 A | 9/1996 | Mitchell | 318/356 |
| 5,646,730 A | 7/1997 | Mitchell et al. | 356/356 |
| 5,671,052 A | 9/1997 | Kawakubo et al. | 356/373 |
| 5,909,283 A | 6/1999 | Eselun | 356/356 |
| 5,991,249 A | 11/1999 | Lee | 369/44.42 |
| 5,995,229 A | 11/1999 | Omi | 356/374 |
| 6,188,062 B1 | 2/2001 | Lee | 250/237 |
| 6,541,761 B1 * | 4/2003 | Holzapfel et al. | 250/231.14 |
| 6,713,756 B1 * | 3/2004 | Yamamoto et al. | 250/231.13 |

FOREIGN PATENT DOCUMENTS

| | | |
|---|---|---|
| EP | 0895239 | 2/1999 |
| GB | 2246430 | 1/1992 |

* cited by examiner

*Primary Examiner*—Thanh X. Luu
(74) *Attorney, Agent, or Firm*—James F. Thompson, Esq.; Chapin & Huang, LLC (57) ABSTRACT

The disclosed optical encoder includes a scale and a sensor head. The scale includes an optical grating and an optical element. The sensor head includes a light source, a detector array, and an index detector all of which are disposed on a substrate. The scale is disposed opposite the sensor head and is disposed for movement relative to the sensor head. The distance between the scale and the sensor head is selected so that the detector array lies near a talbot imaging plane. The light source emits a diverging beam of light, which is directed towards the scale. Light from the diverging beam of light is diffracted by the grating towards the detector array. Light from the diverging beam of light is diffracted by the optical element towards the index detector. The detector array provides a measurement of the position of the sensor head relative to the scale. The index detector provides a reference measurement of the position of the sensor head relative to the scale.

10 Claims, 9 Drawing Sheets

REFERENCE POINT TALBOT ENCODER

REFERENCE TO RELATED APPLICATIONS

This application is a Non-Provisional Application of Provisional Application Ser. No. 60/316,160, filed Aug. 30, 2001 which is related to copending U.S. patent application Ser. No. 60/316,121, filed Aug. 30, 2001 entitled HARMONIC SUPPRESSING PHOTODETECTOR ARRAY which is assigned to the assignee of the present invention and was filed contemporaneously with the present application. That application is incorporated herein in its entirety by reference.

BACKGROUND OF THE INVENTION

The present invention relates to optical encoders. More specifically, the present invention relates to an improved reference point optical encoder.

Diffractive optical encoders are well known in the field of position displacement sensing systems. Such devices are commercially available from the assignee of the present invention as well as from several other vendors. U.S. Pat. Nos. 5,559,600 and 5,646,730 describe examples of known optical encoders.

A recent trend has been to develop diffraction based encoders of reduced size. U.S. Pat. Nos. 5,995,229; 5,671,052; 5,909,283; and 5,991,249 disclose examples of such reduced size encoders. Generally, such reduced size encoders are characterized by their use of a solid-state source of quasi-monochromatic (or nearly monochromatic) illumination, a binary grating, one or more detecting elements, and a reduced number of additional optical components.

One problem with the known reduced size encoders is that the size reduction has generally had a negative impact on their accuracy. Accordingly, there is a need for reduced size diffractive optical encoders characterized by improved accuracy.

SUMMARY OF THE INVENTION

These and other objects are provided by an improved diffractive optical encoder. The encoder may include an index detector for providing a reference position measurement. The index detector may be implemented using a tri-cell configuration. The invention also provides algorithms for processing signals generated by the index detector. The invention also provides other features for improving the accuracy of a diffractive optical encoder.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE FIGURES

For a fuller understanding of the nature and objects of the present invention, reference should be made to the following detailed description taken in connection with the accompanying drawings in which the same reference numerals are used to indicate the same or similar parts wherein.

DETAILED DESCRIPTION OF THE PREFERRED EMBODIMENTS

Figure 1:
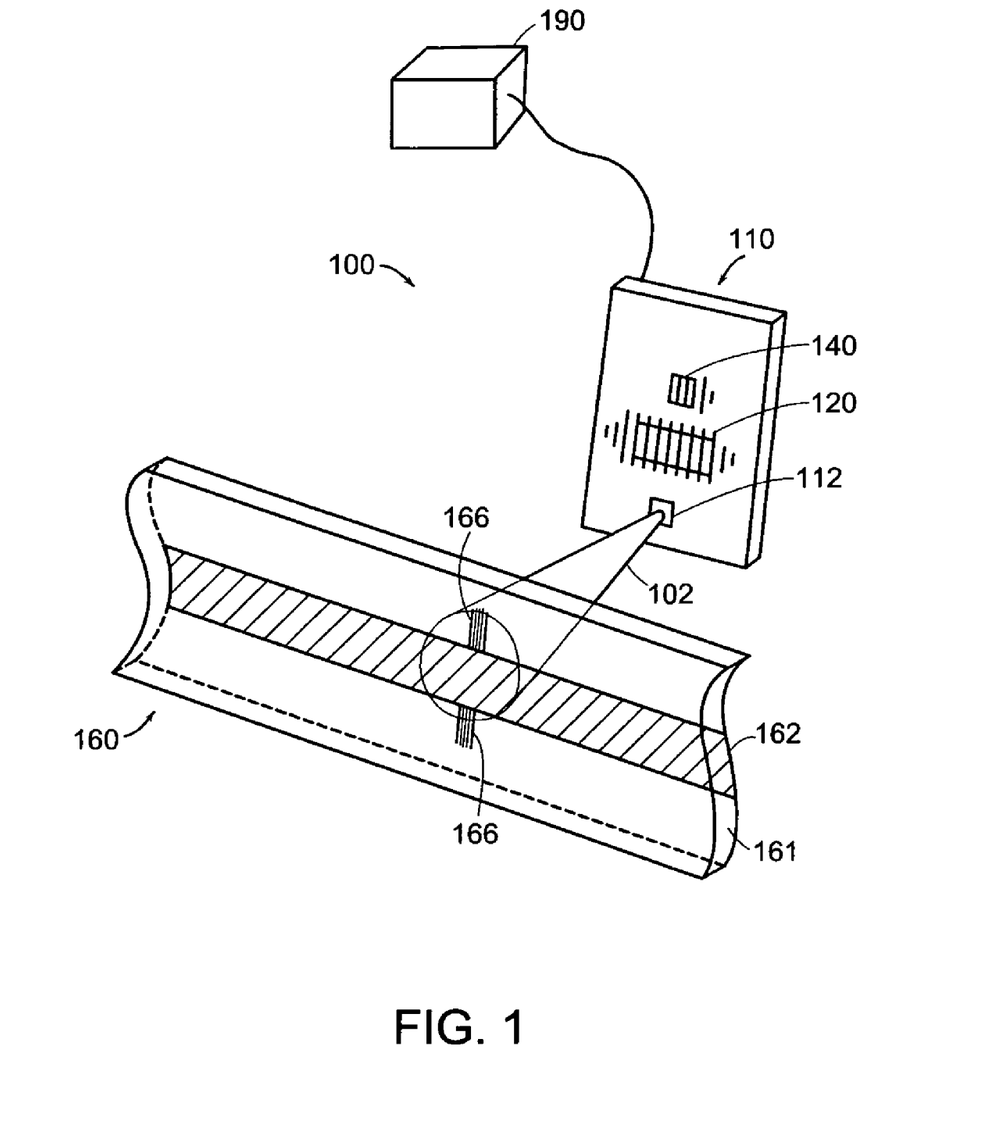
FIG. 1 shows a perspective view of a diffractive optical encoder constructed according to the invention.

FIG. 1 shows a perspective view of a diffractive optical encoder 100 constructed according to the invention. As shown, encoder 100 includes three basic components: an optoelectronic assembly, or sensor head, 110, a scale 160, and a signal processor 190.

Figure 2A:
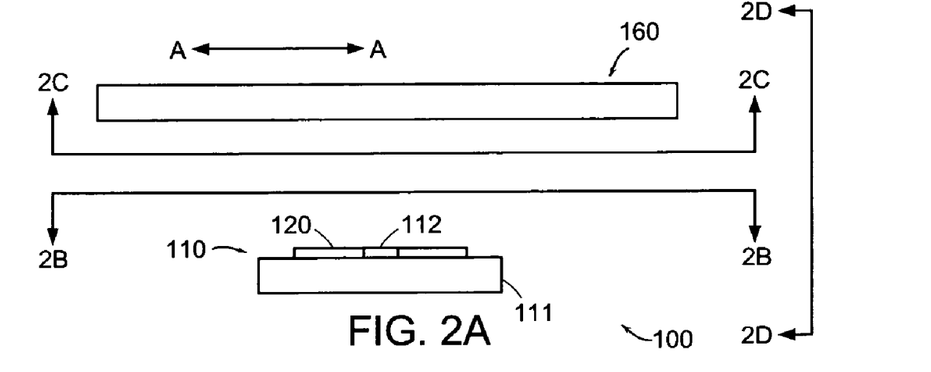
FIG. 2A shows a side view of a diffractive optical encoder constructed according to the invention.
Figure 2B:
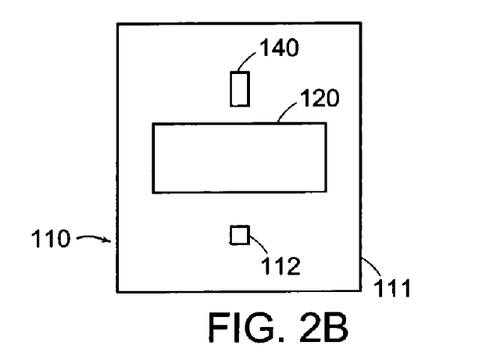
FIG. 2B shows a top view of the sensor head taken in the direction of line 2B—2B as shown in FIG. 2A.
Figure 2C:
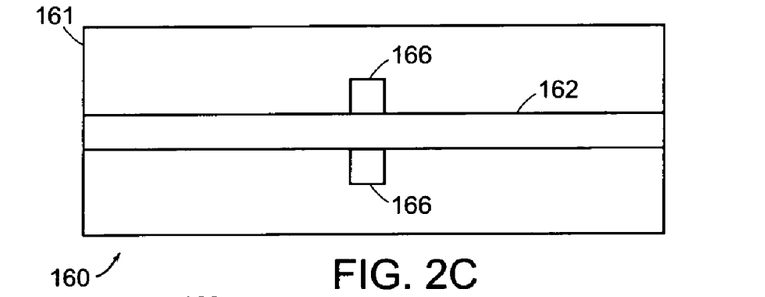
FIG. 2C shows a view of the scale taken in the direction of the line 2C—2C as shown in FIG. 2A.
Figure 2D:
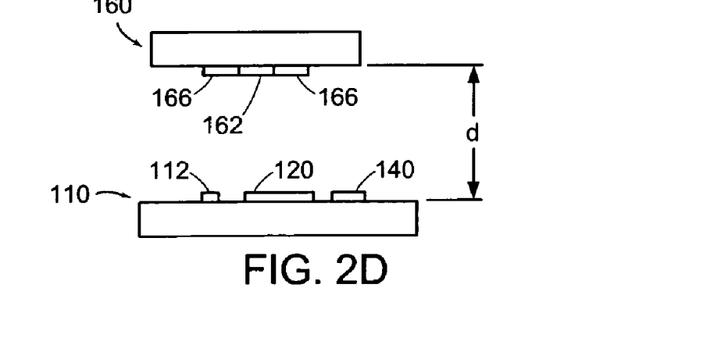
FIG. 2D shows a end view of the encoder taken in the direction of the line 2D—2D as shown in FIG. 2A.

FIG. 2A shows a side view of encoder 100. FIG. 2B shows a view of the sensor head 110 taken in the direction of line 2B—2B as shown in FIG. 2A. FIG. 2C shows a view of the scale 160 taken in the direction of line 2C—2C as shown in FIG. 2A. FIG. 2D shows an end view of encoder 100 taken in the direction of line 2D—2D as shown in FIG. 2A. For convenience of illustration, signal processor 190 is not shown in FIGS. 2A–2D.

With reference to FIGS. 1 and 2A–2D, the sensor head 110 includes a light source 112, a primary detector array 120, and an index, or reference point, detector 140. As shown, the source 112 and the detectors 120, 140 are all mounted on a common substrate 111. Primary detector array 120 and index detector 140 are preferably implemented on a single piece of silicon. The scale 160 includes a substrate 161 upon which is disposed a diffractive grating 162 and two diffractive optical elements (DOEs) 166. The scale 160 is generally disposed opposite the sensor head 110 so that they are separated by a fixed distance d (as shown in FIG. 2D), and so that the scale 160 and the sensor head 110 may move relative to one another in the direction indicated by the arrow A—A shown in FIG. 2A. In operation, the encoder 100 monitors movement of the scale 160 relative to the sensor head 110 (in the direction of arrow A—A), and generates a signal representative of the position of scale 160 relative to sensor head 110.

In operation, light source 112 emits an expanding, or diverging, cone of light 102. Source 112 is preferably a source of quasi-monochromatic light (or nearly monochromatic light) and may be implemented using a vertical cavity surface emitting laser (VCSEL). As shown in FIG. 1, the sensor head 110 and scale 160 are preferably disposed so that when the light cone 102 reaches scale 160, the light cone 102 is wide enough to be incident on a portion of the grating 162 as well as one of the DOEs 166. Some of the light in cone 102 propagates through, and is diffracted by, scale 160, and this light preferably does not return towards the sensor head 110. Also, some of the light in cone 102 is reflected and diffracted back towards sensor head 110. The sensor head 110 and the scale 160 are preferably configured so that (1) light diffracted from grating 162 back towards the sensor head 110 is incident primarily on detector array 120 and (2) light diffracted from the DOE 166 back towards the sensor head 110 is incident primarily on the index detector 140. As will be discussed in greater detail below, light incident on detector array 120 allows encoder 100 to provide a relative measurement of the position of sensor head 110 relative to scale 160, whereas light incident on index detector 140 allows encoder 100 to provide an index point measurement, or reference point measurement, of the position of sensor head 110 relative to scale 160.

Figure 3A:
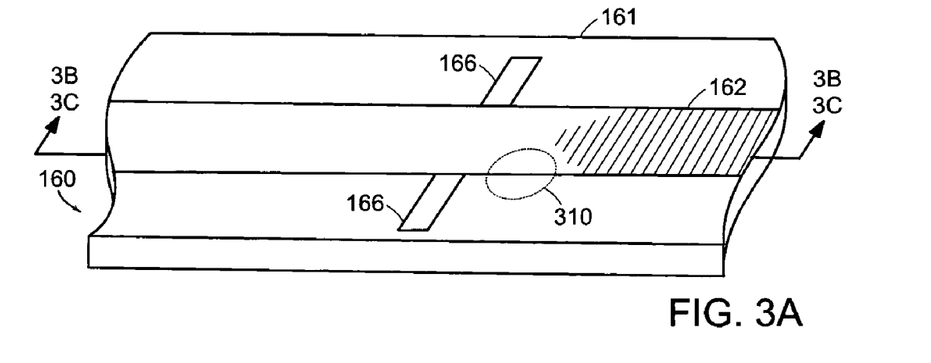
FIG. 3A shows a view of a scale that may be used in a diffractive optical encoder constructed according to the invention.
Figure 3B:
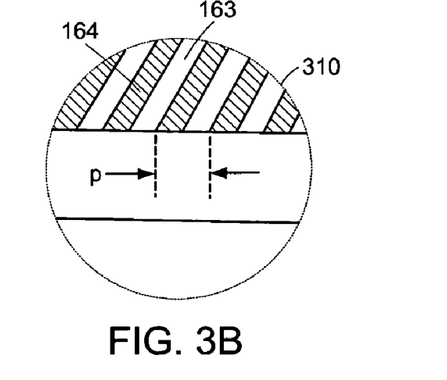
FIGS. 3B and 3C show magnified views of a portion of the scale shown in FIG. 3A showing two different ways of fabricating scales that may be used with diffractive optical encoders constructed according to the invention.
Figure 3C:
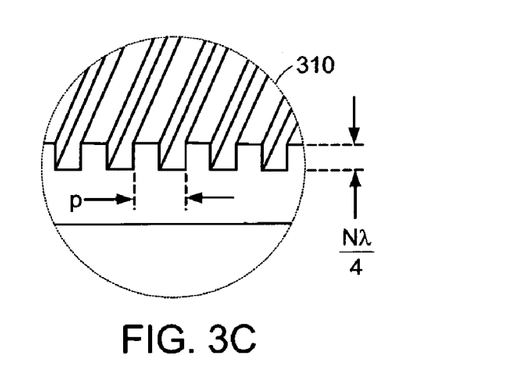

FIGS. 3A, 3B, and 3C show the scale 160 in more detail. Specifically, FIGS. 3B and 3C show expanded versions of the region 310 shown in FIG. 3A. The scale 160 is preferably formed on a glass-like substrate 161. The grating 162 may be composed of alternating optically reflecting stripes 164 and optically transmitting stripes 163 as shown in FIG. 3B. The reflecting stripes 164 are preferably formed by coating regions of substrate 161 with a highly reflecting material. In this embodiment, the transmitting stripes 163 are formed simply by leaving the substrate 161 uncoated. Alternatively, optically absorbing stripes could be used in place of the transmitting stripes. As shown in FIG. 3C, in another embodiment, the stripes could all be reflecting and alternating stripes could be disposed at different depths. A grating 162 of the type shown in FIG. 3B is known as an "amplitude grating". A grating 162 of the type shown in FIG. 3C is known as a "phase grating".

Regardless of whether the grating 162 is implemented as shown in FIG. 3B or 3C, each stripe is preferably a thin rectangle oriented with its short dimension parallel to the displacement direction of the scale (i.e., parallel to the arrow A—A shown in FIG. 1). The center-to-center spacing of the stripes (or left edge to left edge spacing of the stripes, as is shown in FIGS. 3B and 3C) defines the period P of the grating 162. Preferably, the stripes are equally spaced and the short dimension of each stripe is substantially equal to one-half of the grating's 162 period P. Depending on the desired system performance, the period P typically is between 5 and 40 microns, with 20 microns being a preferred value. Ideally, the scale is anti-reflection coated on the exposed glass regions on both sides of the scale.

Figure 4:
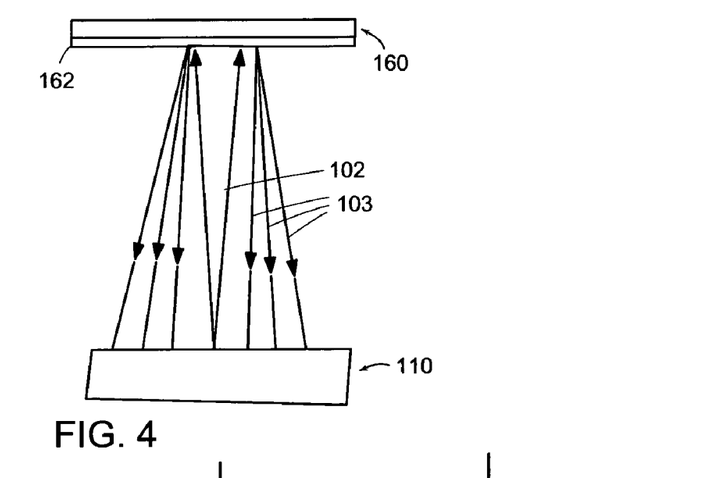
FIG. 4 shows a side view of a diffractive optical encoder showing some of the beams diffracted from the scale towards the sensor head.

Returning to FIG. 1, grating 162 diffracts light from cone 102 into multiple cones of light that are directed towards the sensor head 110. FIG. 4, which is a view of encoder 100 in the same orientation as shown in FIG. 2A, illustrates some of the cones of light 103 diffracted by grating 162 towards the sensor head. The cones 103 of diffracted light optically interfere with one another and generate complex fringe-like patterns in the space between the scale 160 and the sensor head 110.

Figure 5:
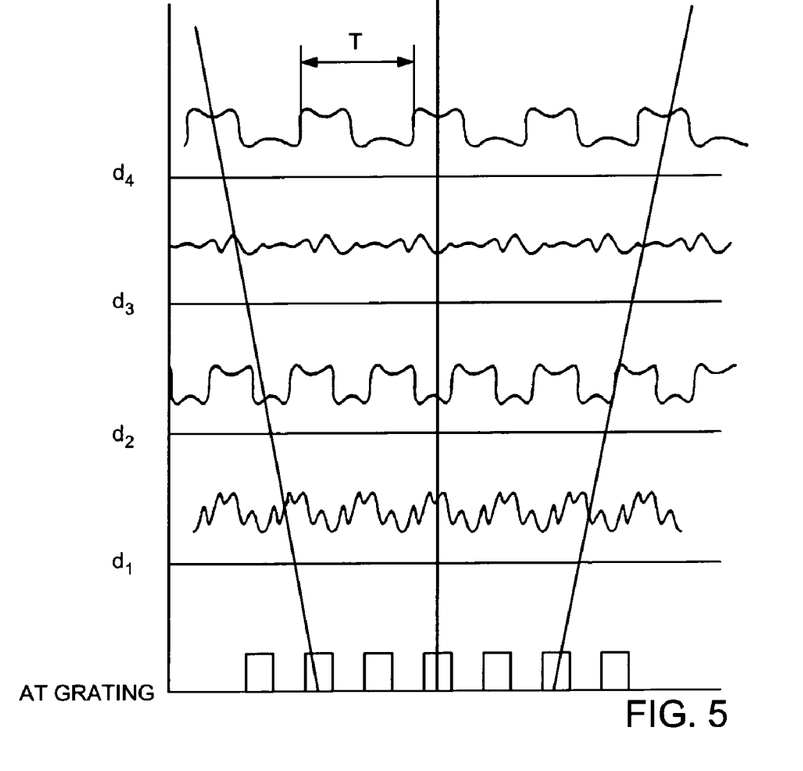
FIG. 5 illustrates the interference fringe pattern at different distances away from the scale.

FIG. 5 schematically illustrates the intensity of the fringe patterns formed by interference between diffracted light cones 103 at different distances away from the grating 162. As shown, at distances $d_2$ and $d_4$ away from the grating 162, the optical fringe pattern generated by interference between light cones 103 is a relatively high contrast periodic pattern. Conversely, at distances $d_1$ and $d_3$ away from the grating 162, the optical fringe pattern is relatively low contrast. The planes at distances $d_2$ and $d_4$ away from the grating 162 may be referred to as self-imaging planes, or "Talbot (or talbot) imaging planes". At these talbot imaging planes, the diverging cones of diffracted light combine with the same relative phases they had at the grating and essentially form an image of the grating 162 itself. As is discussed generally in U.S. Pat. No. 5,991,249, these high contrast imaging planes regularly occur and the distance between the grating and any of these imaging planes may be calculated according to the following Equation (1).

$$\frac{z_0 z_1}{(z_0 + z_1)} = \frac{NP^2}{\lambda} \tag{1}$$

In Equation (1), $z_0$ equals the distance between light source 112 and grating 162, $z_1$ equals the distance between grating 162 and the talbot self imaging planes, N is an integer, P is the period of the grating, and $\lambda$ is the wavelength of light emitted by source 112.

As shown in FIG. 5, the first talbot plane (at distance $d_2$ away from the scale) is one hundred eighty degrees out of phase with the second talbot plane (at distance $d_4$ away from the scale). In general, adjacent talbot planes are one hundred eighty degrees out of phase with each other. The reason for this one hundred eighty degree phase shift between adjacent talbot planes is that at even planes (i.e., talbot planes for which N is equal to an even number), all orders of diffracted light combine with the same relative phases they had at the grating, whereas at odd planes (i.e., talbot planes for which N is equal to an odd number), the zeroth order is one hundred eighty degrees out of phase and all other orders combine with the same relative phases they had at the grating.

It should be noted that the patterns illustrated in FIG. 5 are characteristic of the fringe patterns generated when the zeroth order beam contributes to the pattern (e.g., when the fringe pattern is formed by interaction between the zeroth order, plus first order, minus first order, as well has other higher order diffracted beams). If the zeroth order beam were eliminated, then the fringe patterns would look significantly different from those illustrated in FIG. 5. Specifically, in the case of a phase grating with ½-wavelength delays, the planes of low contrast are the Talbot imaging planes and the planes of high contrast are between the Talbot imaging planes. In the regions of high contrast, the fringe patterns do not appear as images of the original grating, as is the case with an amplitude grating. Rather, the fringe patterns for the phase grating are generally a complicated combination of harmonic components, usually dominated by a component with a period generally one half that of the period illustrated in the talbot planes of FIG. 5. As with the amplitude grating, the period of the fringe pattern from a phase grating increases in proportion to the distance from the scale. In general, it is difficult to predict the planes in which the fringe pattern from a phase grating will exhibit the least harmonic distortion and/or noise.

Accordingly, elimination of the zeroth order beam may be regarded as causing degradation of the periodic signal that is monitored by the encoder. However, it may still be advantageous to construct encoders in which the zeroth order beam is eliminated for at least the following reason; as a practical matter, in an encoder of the design of the present invention, the higher diffracted orders are quickly filtered out by propagation and the resulting fringe patterns often approach pure sinusoidal forms.

Notwithstanding the above benefit of phase gratings, the preferred grating for this invention is an amplitude grating. Amplitude gratings (as shown in FIG. 3B) are much more widely available commercially than phase gratings (as shown in FIG. 3C). Therefore, designing an encoder that uses an amplitude grating is advantageous because it is less expensive and generally easier to acquire the scale. However, use of an amplitude grating does imply the presence of the zeroth order beam. The design of encoders in which the zeroth order beam is present will now be discussed.

In encoders constructed according to the invention, the sensor head 110 and scale 160 are preferably disposed so that detector array 120 lies in one of the talbot imaging planes (i.e., so that the distance between the scale and the sensing surface of the detector array is equal to $z_1$ as calculated according to the above Equation (1)). As is apparent from FIGS. 2A and 2D, in encoders constructed according to the invention, the upper light emitting surface of source 112 is preferably substantially coplanar with the upper, or sensing, surface of detector array 120. So, in encoders constructed according to the invention, the distance $z_0$ is substantially equal to the distance $z_1$. In the case where $z_0$ equals $z_1$, the above Equation (1) reduces to the following Equation (2).

$$z_0 = \frac{2NP^2}{\lambda} \quad (2)$$

So, to insure that the detector array 120 is disposed in one of the talbot imaging planes, in encoders constructed according to the invention, the distance d (as shown in FIG. 2D) between the sensor head 110 and the scale 160 is preferably adjusted so the separation between the scale 160 and the detector array 120 is substantially equal to $z_0$ as calculated by Equation (2) for some integer value of N. However, since it is almost impossible to insure that the actual distance between the scale 160 and the detector array 120 is exactly equal to $z_0$, this distance is preferably selected so that the sensing surface of the detector array 120 lies in a region near one of the talbot planes. The desired size of this region will now be discussed.

As shown in FIG. 5, the distance between the scale and the first talbot plane is $d_2$. In addition, the distance between the scale and the nth talbot plane is $nd_2$ (i.e., n times $d_2$). If it is desired to locate the detector array at the nth talbot plane, then the distance between the scale and the detector array is preferably equal to $nd_2$ plus or minus $0.5d_2$. So, for example, if it is desired to locate the detector array at the third talbot plane, then the detector array should be placed within the region extending from $2.5d_2$ away from the scale to $3.5d_2$ away from the scale. Continuing this example, if the space between the scale and the detector array is equal to $3.0d_2$, then the detector array will lie exactly in the third talbot plane. If this distance is slightly greater or less than $3.0d_2$, then the contrast of the fringe pattern will be slightly less than optimal and accuracy of the encoder will correspondingly be slightly decreased. As the detector array is moved further from the desired location of $3.0d_2$, contrast of the fringe pattern will continue to decrease until the contrast reaches a minimal value at the distance $2.5d_2$ or $3.5d_2$ (i.e., the contrast will be at minimal value at these locations because the talbot planes are separated by evenly spaced planes characterized by minimal contrast). Since the talbot planes are separated by evenly spaced planes of minimum contrast, $nd_2$ plus or minus $0.5d_2$ denotes the maximum size of the range within which the detector array should be located. Performance of an encoder will increase if the detector array is located $nd_2$ plus or minus $0.2d_2$ away from the scale, and performance of the encoder will increase still further if the detector array is located $nd_2$ plus or minus $0.1d_2$ away from the scale. More generally, the detector array 120 preferably lies in a region bounded by two planes, where the first plane is separated from the scale by $nd_2$ plus $xd_2$, and the second plane is separated from the scale by $nd_2$ minus $xd_2$, where x is less than or equal to one half. One preferred value for x is 0.2, and a more preferred value for x is 0.1.

As noted above, if the zeroth order beam is eliminated, then a high contrast fringe pattern may be incident on the detector array regardless of the spacing between the detector array and the scale. Accordingly, it may be advantageous to alleviate the above-discussed restrictions on spacing between the detector array and scale by using a scale 160 that has a phase grating (as shown in FIG. 3C) that substantially eliminates the zeroth order beam. In such an embodiment, the distance between the upper stripes and the lower stripes (or the depth of the lower stripes) is preferably substantially equal to N quarter-wavelengths of the light produced by light source 112, where N is an odd integer. Another advantage of using such a phase grating is that it reduces the period of the optical fringe pattern by a factor of two and thereby potentially increases the resolution of the encoder by a factor of two. Alternatively, if it is desired to produce an encoder using a phase grating in which the zeroth order beam is present, then the distance between the upper stripes and the lower stripes is preferably substantially equal to (N+x) times one quarter of the wavelength of the light produced by light source 112, where N is an odd integer, and where x is a small number that is less than one half.

As shown in FIG. 5, the interference fringes are periodic and are characterized by a period T. Since the grating 162 is illuminated by an expanding cone of light, the period T of the fringes is in general a function of the distance away from the grating as shown in the following Equation (3).

$$T = \frac{(z_0 + z_1)*P}{z_0} = \frac{(2z_0 + e)*P}{z_0} = KP \quad (3)$$

In Equation 3, $z_0$ is the optical path length between the light source 112 and the scale 160, $z_1$ is the optical path length between the scale and the detector array 120, P is the period of the grating, e is the offset between the light source 112 and the detector array 120 (i.e., or the difference between $z_0$ and $z_1$), and K is the scale factor.

As may be seen from Equation (3), in the special case in which the distance between the light source and the grating ($z_0$) is equal to the distance between the detector array and the grating ($z_1$) (viz., e is zero), the scale factor K is 2 so the period T of the interference fringes is always equal to a constant value which is twice as large as the period of the grating P (i.e., T=2P). Since, as discussed above, the upper light emitting surface of source 112 is preferably substantially coplanar with detector array 120, in encoders constructed according to the invention, the distance between the light source and the grating ($z_0$) is substantially equal to the distance between the grating and the detector array ($z_1$). Accordingly, in encoder 100, the period T of the fringes incident on detector array 120 is always substantially equal to the constant 2P.

In operation, movement of the scale 160 relative to the sensor head 110 in the direction of arrow A—A as shown in FIG. 2A causes the fringe pattern incident on detector array 120 to move across the detector array 120 in the direction of arrow A—A. Movement of the incident fringe pattern across the detector array is equivalent to a change in the phase angle between the incident fringe pattern and the detector array. Detector array 120 and the associated signal processor 190 monitor this phase angle and thereby monitor the position of the sensor head 110 relative to the scale 160.

Detector array 120 is preferably constructed as an array of photodetectors configured to facilitate measurement of the phase angle between the detector array and the fringe pattern incident on the detector array. Copending U.S. patent application Ser. No. 60/316,121 entitled HARMONIC SUPPRESSING PHOTODETECTOR ARRAY, which was incorporated by reference above, discloses several detector arrays which may be used to implement detector array 120. However, any detector array that permits measurement of the phase angle between the array and the incident fringe pattern may be used to implement array 120. The output signals generated by detector array 120 are applied to signal processor 190. Signal processor 190 preferably generates an output signal representative of the phase angle between the array 120 and the fringe pattern incident on array 120.

Figure 6:
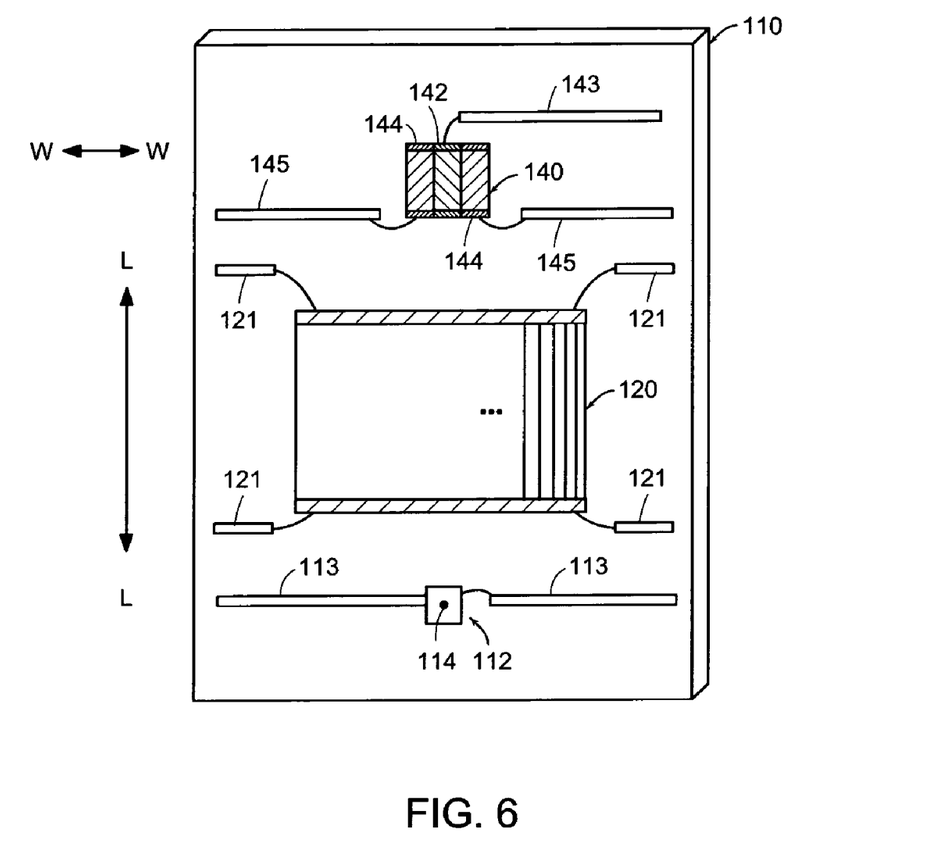
FIG. 6 shows a more detailed view of the top of a sensor head constructed according to the invention.

FIG. 6 shows a view of the top of sensor head 110 similar to the view shown in FIG. 2B, however, FIG. 6 shows additional detail. As shown, detector array 120 includes a plurality of rectangular photodetectors, each of which has a long axis extending in the direction of the line L—L (i.e., along the length of the photodetector) and a short axis extending in the direction of the line W—W (i.e., along the width of the photodetector). Detector array 120 is preferably configured for use with the 4-bin algorithm and photodetectors in the array are accordingly, preferably electrically connected to four bonding pads 121. Processing circuitry 190 (not shown) is electrically connected to bonding pads 121 to permit monitoring of array 120. Light source 112 is preferably electrically connected to, and controlled by electrical signals applied to, two bonding pads 113. The aperture 114 of VCSEL 112, through which all light emitted by the VCSEL passes is also shown in FIG. 6.

As is also shown in FIG. 6, index detector 140 is preferably implemented in a tri-cell configuration that includes a central photodetector 142 and two end photodetectors 144 disposed on either side of the central photodetector 142. The central photodetector 142 is electrically connected to a bonding pad 143. Each of the end photodetectors 144 is electrically connected to a bonding pad 145. Processing circuitry 190 (not shown in FIG. 6) is electrically connected to bonding pads 143, 145 to permit monitoring of index detector 140. The central detector 142 is preferably aligned with light source 112 so that a line extending from aperture 114 parallel to the line L—L will bisect the central detector 142.

Referring to FIG. 1, the diverging light cone 102 emitted by light source 112 is shown as illuminating DOE 166. It will be appreciated that DOE 166 will move into and out of light cone 102 as the scale 160 and sensor head 110 are moved with respect to one another in the direction of the arrow A—A as shown in FIG. 2A. When DOE 166 is illuminated by light cone 102, the DOE 166 diffracts light from cone 102 towards index detector 140. DOE 166 is preferably implemented using an anamorphic zone plate lens. When it is illuminated by light cone 102, DOE 166 preferably generates a "line image" of the light source 112. That is, DOE 166 preferably diffracts a "line of light" back towards index detector 140. The line image generated by DOE 166 and incident on sensor head 110 is preferably substantially parallel to the line L—L as shown in FIG. 6.

For clarity, only one DOE 166 is shown in the scale 160 in FIG. 1. However, as shown in FIGS. 2C and 3A, scale 160 may include two DOEs 166 disposed on either side of the grating 162. The cone of light 102 that reaches scale 160 is preferably large enough to illuminate a portion of the grating 162 and only one of the DOEs 166. However, if two DOEs 166 are included on scale 160, the scale 160 and the sensor head 110 may be assembled without regard to orientation when forming encoder 100. That is, if scale 160 includes two DOEs 166, regardless of whether the scale 160 is installed right side up or up side down, one of the DOEs 166 will be illuminated by the light cone 102. It will of course be appreciated that scale 160 can also be built using only one DOE 166. Also, scale 160 can include two DOEs 166 that are not disposed symmetrically (e.g., one DOE may be disposed near the center of the scale and another DOE may be disposed near an end of the scale).

In operation, as scale 160 and sensor head 110 are moved with respect to one another (in the direction of line A—A as shown in FIG. 2A), the line image generated by DOE 166 will sweep across the index detector 140. Movement of the scale 160 relative to the sensor head 110 in the direction of line A—A by a distance D causes the line image generated by DOE 166 to move across sensor head 110 by a distance equal to KD, where K is the scale factor from equation 3. So, for the case in which e is zero (i.e., where $z_0$ equals $z_1$, as described in Equation (3)), as the scale 160 is displaced relative to the sensor head 110, the line image generated by DOE 166 moves across the sensor head 110 at twice the rate of movement of the scale. The line image generated by DOE 166 will be centered on the central photodetector 142 of index detector 140 only when the DOE 166 is directly over the light source 112 (i.e., when the encoder is configured as shown in FIG. 1). Processing circuitry 190 generates an output signal representative of the light incident on index detector 140. This output signal may be called an index signal. Preferably, the index signal is characterized by a pulse every time the line image generated by DOE 160 sweeps across the index detector 140. It will be appreciated that such a pulse provides an index point, or reference point, measurement of the relative orientations of scale 160 and sensor head 110. The measurement of distance, or displacement, between scale 160 and sensor head 110 generated by detector array 120 is a relative measurement because the fringe pattern incident on array 120 is a periodic signal. However, the line image generated by DOE 160 will only be incident on index detector 140 when the light source 112, the DOE 160, and the index detector 140 are all in a particular orientation, and that is why the index signal provides a reference measurement.

Processing circuitry 190 may use a variety of algorithms for generating the index signal. Preferably, processing circuitry 190 uses an algorithm that is insensitive to variations in the output signals generated by index detector 140 that may be caused by light source intensity variations, stray light, and misalignments of the sensor head 110 and the scale 160. The index signal is preferably characterized by a pulse whenever the line image diffracted by DOE 166 sweeps across the index detector 140 and the width of that pulse is preferably substantially equal to the period P of grating 162. Such a pulse width allows the pulse to uniquely identify, or correspond with, a single fringe of the pattern generated by grating 162. In one preferred embodiment, the width of the central photodetector 142 (as measured in the direction of the line W—W as shown in FIG. 6) is substantially equal to twice the period P of the grating 162. In this embodiment, the index signal is preferably high whenever the center of the line image generated by DOE 166 is incident on the central photodetector 142 and is preferably low at all other times.

Figure 7:
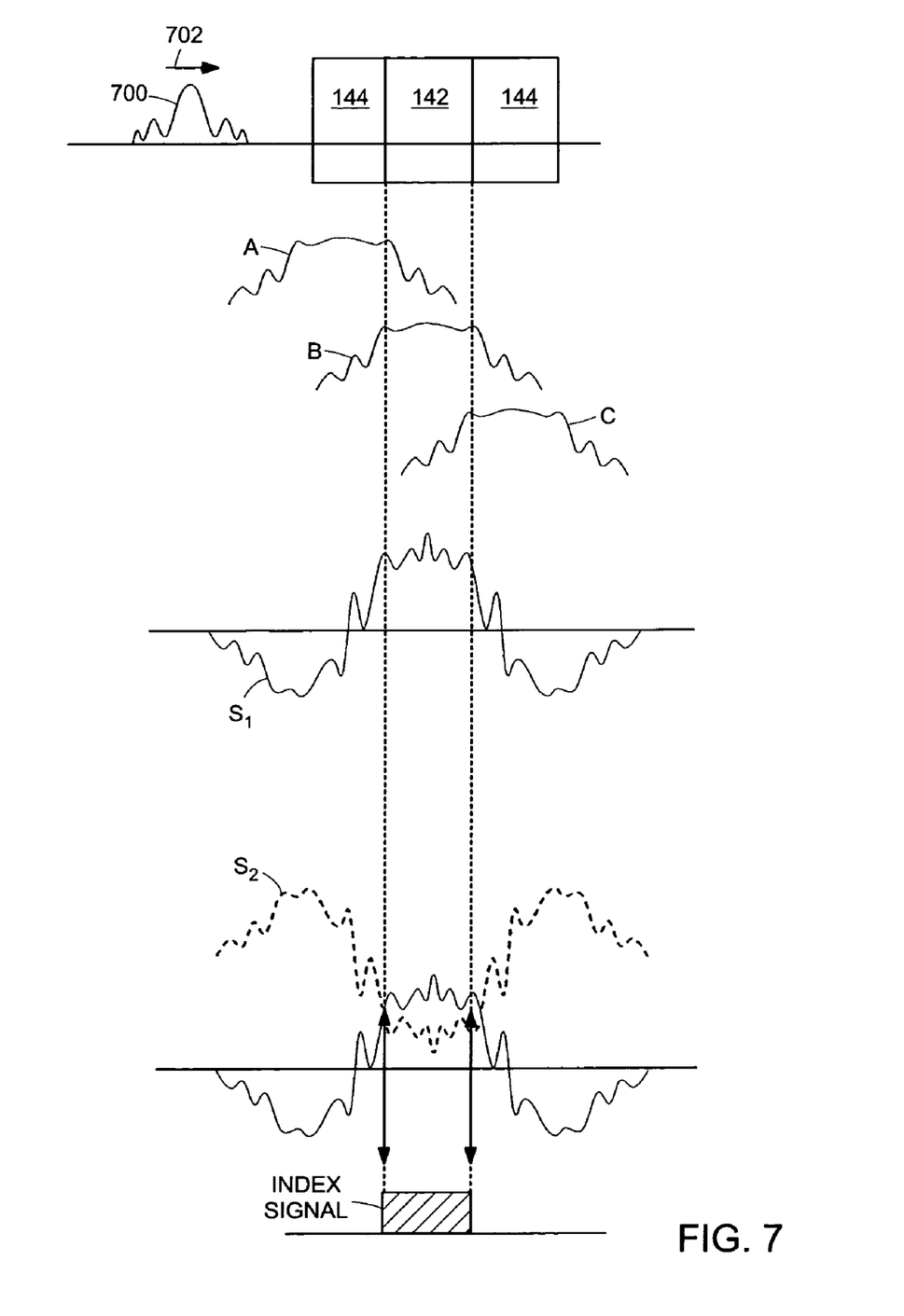
FIG. 7 shows graphs of raw signals generated by the index detector of encoders constructed according to the invention and graphs of signals generated according to the invention in response to those raw signals.

FIG. 7 illustrates the general shape of the output signals generated by index detector 140 when a line image 700 moves across the array in a left to right direction as indicated by arrow 702. The curve A shows the shape of the output signal generated by the left end photodetector 144 as line image 700 moves over the photodetector. The curve B shows the shape of the output signal generated by the central photodetector 142 as line image 700 moves over the photodetector. Finally, the curve C shows the shape of the output signal generated by the right end photodetector 144 as line image 700 moves over the photodetector. One preferred method of generating the index signal from the raw output signals A, B, and C is for processing circuitry 190 to generate the two signals $S_1$ and $S_2$ according to the following Equation (4).

$$S_1 = -A + 2B - C \quad (4)$$

$$S_2 = A - 2B + C$$

FIG. 7 also shows the signals $S_1$ and $S_2$ generated according to Equation (4) from the raw signals A, B, and C shown in FIG. 7. It will be apparent from Equation (4) that both signals $S_1$ and $S_2$ are independent of stray light because any light that is incident on all three photodetectors of index detector 140 will be subtracted out, or will not contribute to $S_1$ and $S_2$.

As shown, the signal $S_1$ generally contains a positive peak when the center of line image 700 is incident on the central photodetector 142. In addition, signal $S_1$ contains a number of sidelobes, or ringing, traceable to the inherent diffraction effects in the line image. Similarly, the signal $S_2$ generally contains a negative peak when the center of line image 700 is incident on the central photodetector 142, and a number of sidelobes from the diffraction effects in the line image. One preferred method of generating the index signal from the signals $S_1$ and $S_2$ is shown in the following Equation (5).

$$\text{index signal} = \begin{cases} 1 & \text{when } S_1 > (S_2 + O) \\ 0 & \text{otherwise} \end{cases} \quad (5)$$

In Equation (5), O is a constant offset that is preferably greater than the expected sidelobe peaks in $S_1$ and $S_2$ and is also preferably less than the smallest expected maximum value of $S_1$.

FIG. 7 also shows an index signal generated according to Equation (5). As shown, this index signal has the desired characteristic of being equal to a one, or a high value, whenever the center of the line image generated by DOE 166 is incident on the central photodetector 142 and is equal to zero, or a low value, at all other times. Such an index signal will be characterized by a pulse whenever the line image generated by DOE 166 sweeps across the index detector 140.

While use of Equation (5) is a preferred method of generating the index signal, it will be appreciated that other approaches could be used as well. For example, the index signal could simply be set to a high value whenever the signal $S_1$ is greater than a selected constant value.

The widths of the end photodetectors 144 are preferably equal to the width of the central photodetector 142. This insures that stray light will not contribute to the signals $S_1$ and $S_2$. However, it will be appreciated that in other embodiments, the width of the end photodetectors 144 could be different than the width of the central photodetector 142. One advantage to using end photodetectors 144 that are of different widths than the central photodetector 142 is that such a configuration can reduce the sidelobes of the signals $S_1$ and $S_2$ by effectively averaging out the diffraction effects in the line image. Also, adjusting the detector widths and/or spacings can allow the ringing in the signals from the end photodetectors to cancel out the ringing in the signal from the central photodetector. If such an approach is used, the weighting of the raw signals in Equation (4) is preferably altered so that the signals $S_1$ and $S_2$ are still insensitive to stray light. In yet other embodiments, the index detector 140 could be constructed by using only the central detector 142 and by eliminating the end detectors 144. However, such an approach is not preferred because the resulting index signal becomes too sensitive to noise and misalignments.

Figure 8:
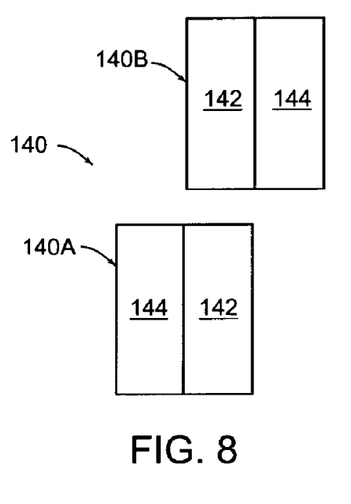
FIG. 8 illustrates an alternative embodiment of an index detector constructed according to the invention.

FIG. 8 shows yet another embodiment of index detector 140. In this embodiment, detector 140 includes two bi-cell detectors 140A and 140B. Bi-cell 140A includes a center detector 142 and a left end detector 144. Bi-cell 140B includes a center detector 142 and a right end detector 144. The two bi-cells are preferably positioned so that a line extending from light source 112 in the direction of the line L—L, as shown in FIG. 6, would bisect the center detectors 142 of both bi-cells 140A and 140B. It will be appreciated that the signals $S_1$ and $S_2$ may easily be generated according to the above Equation (4) using bi-cell detectors 140A, 140B. For example, the signal $S_1$ may be generated simply by adding the output signals generated by the two central detectors 142 together and subtracting from that sum the output signals generated by the two end detectors 144.

Figure 9:
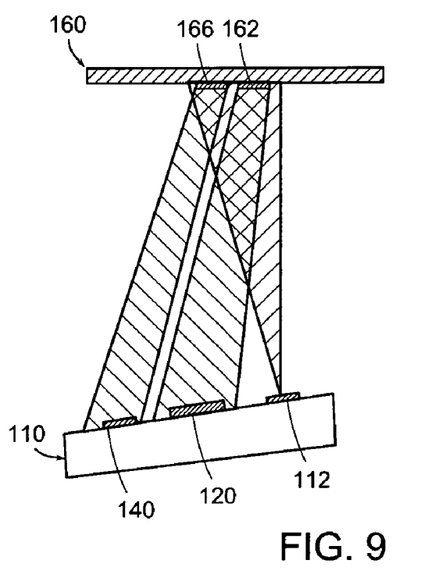
FIG. 9 shows an end view of a diffractive optical encoder constructed according to the invention in which the sensor head is tilted with respect to the scale.

FIG. 9 shows an end view of a preferred embodiment of a diffractive optical encoder 100 constructed according to the invention. FIG. 9 shows a view of the encoder 100 taken in the direction of line 2D—2D as shown in FIG. 2A. The principal difference between FIG. 2D and FIG. 9 is that in FIG. 9 the sensor head 110 is shown tilted with respect to (instead of substantially parallel to) grating 160. More specifically, the sensor head 110 is tilted about an axis that is substantially parallel to the direction of travel of the scale 160 (i.e., parallel to the line A—A as shown in FIG. 2A). Preferred embodiments of encoder 100 include a tilt as shown in FIG. 9. Tilting the sensor head 110 with respect to the grating 160 as shown in FIG. 9 provides at least two advantages. First, it reduces the amount of light that reflects from the scale 160 back into the light source 112. Second, it increases and balances the amount of light that reaches detector array 120 and index detector 140.

Generally, it is undesirable for light reflected from the scale to enter the light source 112. First, even the preferred VCSEL light sources are detrimentally affected by reflected light that re-enters the lasing medium. Second, since the emitting surface of a laser is somewhat reflective, any light that reaches this surface will be reflected back towards the scale 160. This multiply reflected and/or diffracted stray light, if not properly controlled, can cause extraneous components in the detected signals. In the present invention, the intentional tilt between the optoelectronics plane and the scale has been selected to direct these extraneous beams away from the detectors. Tilting the sensor head 110 relative to the scale as shown in FIG. 9 effectively (1) prevents light reflected from the scale from re-entering the light source 112, or significantly reduces the amount of such light and (2) insures that light reflected off of the light source does not reach the detectors, or significantly reduces the amount of such light.

The second function of introducing a tilt between the sensor head 110 and the scale 160 is to increase and balance the light levels reaching the detectors. The sensor head 110 is preferably tilted so as to place the peak intensity of the specularly reflected cone of light nearly half way between detector array 120 and index detector 140. This maximizes the amount of light that is incident on the two detector regions 120, 140, while minimizing the fall-off of light intensity on both regions.

As discussed above, it is advantageous to construct encoder 100 so that the optical path length between light source 112 and scale 160 is substantially equal to the optical path length between scale 160 and the detector array 120. Doing so insures that the period of the fringe pattern incident on detector array 120 is independent of the distance between the sensor head 110 and the scale 160. When light source 112 is implemented as a VCSEL that emits light in a direction perpendicular to the plane of sensor head 110 (as illustrated in FIG. 1), equalizing these optical path lengths can be achieved by making the top surface of detector array 120 coplanar with the emitting surface of light source 112. However, since light sources and photodetectors are each typically characterized by a particular thickness, it can be difficult in practice to make these surfaces coplanar.

Figure 10A:
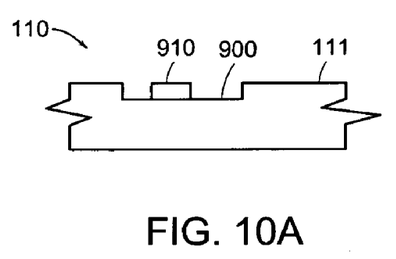
FIGS. 10A–10D illustrate different strategies for equalizing the optical path length between the light source and the scale and the optical path length between the scale and the detector array according to the invention.

FIG. 10A shows one technique for making these surfaces coplanar. As shown in FIG. 10A, a trench 900 has been etched into the substrate 111 of sensor head 110. Either the photodetectors of detector array 120 or the light source 112 may be disposed inside trench 900 as indicated by the box 910. It will be appreciated that using such a trench can compensate for differences in the thickness of the detector array 120 and the light source 112. A trench such as trench 900 may be provided either by machining substrate 111 or by using photolithographic techniques.

Figure 10B:
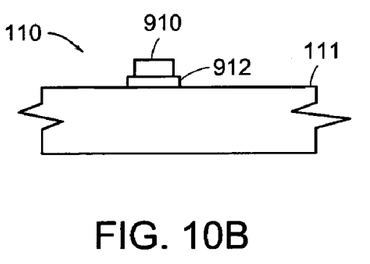

FIG. 10B shows another technique for making these surfaces coplanar. As shown in FIG. 10B, a spacer 912 has been disposed on the upper surface of substrate 111 of sensor head 112. As indicated by the box 910, either the photodetectors of detector array 120 or the light source 112 may be disposed on such a spacer. Spacers such as spacer 112 of desired thickness may be formed on substrate 111 for example by material deposition or by adhering a previously formed spacer to the top of substrate 111.

Figure 10C:
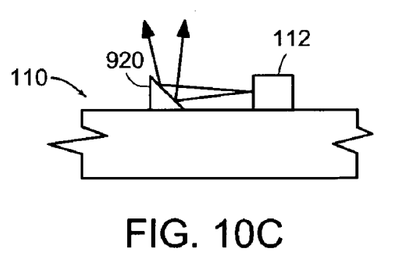
Figure 10D:
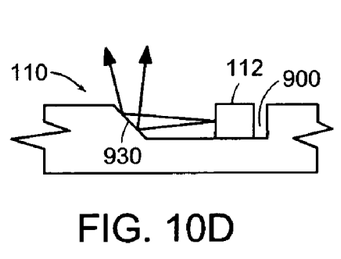

FIGS. 10C and 10D illustrate how the light source 112 can be implemented using an edge emitting laser diode instead of a VCSEL and also illustrate other strategies for equalizing the optical path length between the light source 112 and the scale 160 and the optical path length between the scale 160 and the detector array 120. In FIG. 10C, the light source 112 is implemented using an edge emitting laser diode that emits light in a direction basically parallel to the upper surface of sensor head 110. In this embodiment, sensor head 110 also includes a reflecting mirror 920 disposed in the optical path of source 112. Mirror 920 reflects the cone of light emitted by source 112 up towards the scale (not shown). In FIG. 10D, the light source 112 is again implemented using an edge emitting laser diode. In this embodiment, the light source is disposed in a trench 900 that has been provided in the substrate 111 of sensor head 110. One edge 930 of trench 900 has been made reflecting so that edge 930 reflects the cone of light emitted by source 112 up towards the scale (not shown). It will be appreciated that mirror 920 or reflective edge 930 may be implemented using reflective prisms or etched fold mirrors as described in U.S. Pat. No. 6,188,062. The arrangements illustrated in FIGS. 10C and 10D each affect the optical path length between the light source 112 and the scale. It will be appreciated that such arrangements can be used to equalize the optical path length between the source 112 and the scale and the optical path length between the scale and the detector array 120.

Alternatively, to avoid the cost of using trenches or spacers as suggested in FIGS. 10A–10D to equalize the optical path between the light source 112 and the scale 160 ($z_0$) and the optical path between the scale 160 and the detector array 120 ($z_1$), the notion of having equal optical path lengths, and a fringe period that is independent of the distance between the scale and the detector array, can be abandoned. In such a case, the period T of the fringes incident on detector array 120 are proportional to the period P of the grating and are given by the above Equation (3). When designing such an encoder, it is desirable to calibrate the scale factor between the scale and the detector array and to optimize the encoder accordingly.

In the ideal case, where $z_0$ equals $z_1$, and there are no other misalignments, the encoder scale factor is substantially equal to two (i.e., because the period T of the fringes incident on the detector array are substantially equal to two times the period P of the grating). However, in practice the actual scale factor associated with optical encoders constructed according to the invention tends to be close, but not exactly equal, to two. One principal reason that the scale factor is generally not exactly equal to two is that is it difficult to measure components accurately enough and to fabricate spacers/trenches precisely enough to make $z_0$ exactly equal to $z_1$. Also, other factors, such as misalignments, contribute to perturbing the scale factor from the ideal value of two. Finally, the preferred scale factor for an optical encoder is the one which provides the highest accuracy performance, without direct regard to the actual value of the fringe or detector periods.

Given this criterion (best accuracy), a preferred method for determining the scale factor of an optical encoder constructed according to the invention and then calibrating that encoder in view of the measured scale factor will now be discussed. Preferably, a calibration sensor head and a calibration scale are produced. The calibration scale has a calibration grating similar to grating 162, however, rather than being characterized by a substantially uniform period (as grating 162 preferably is), the calibration grating includes several different sections, each section being characterized by a unique period. One section is fabricated with the design period P (e.g., P equal to 20 microns). Other sections are characterized by periods that deviate slightly from P. Preferably, the various sections of calibration grating span a range of periods around P in incremental steps of approximately 0.5% of P. That is, the various sections have periods that are approximately P, 0.995P, 1.005P, 0.990P, etc. The inventors have observed that a range of periods of +/−3% typically includes the optimum period. Of course, as will be obvious to one skilled in the art, should the best performance be observed at an end point of the range, then a new calibration grating should be produced with a wider range. The various sections of the calibration should be distributed spatially on a common substrate and be separated enough for easy identification and selection. For ease of use and alignment, the axes of the various sections should all be parallel. The calibration sensor head includes a calibration detector array that is preferably configured (e.g., using one of the methods described in the above-identified U.S. patent application Ser. No. 60/316,121 entitled HARMONIC SUPPRESSING PHOTODETECTOR ARRAY to measure the phase angle of a fringe pattern incident on the array that has a period T substantially equal to the design point, 2P. The calibration sensor head and the calibration scale are then configured to form a calibration encoder (e.g., as shown in FIGS. 2A–2D).

If the encoder scale factor of the calibration encoder were exactly equal to two (and there were no other perturbing effects), then the calibration encoder would provide the most accurate results when the calibration detector array were used with the section of the calibration grating characterized by a period of P. However, normally, the most accurate results will actually be provided when the calibration detector array is used with some other section of the calibration grating. The calibration encoder is preferably tested using each of the sections of the calibration grating to determine which section of the calibration grating provides the most accurate results. Typically, the accuracy of each test is judged by the rms difference between the encoder output and a displacement truth sensor that has made simultaneous measurements of the grating motion. A laser interferometer has been used successfully as the truth sensor.

Since the calibration encoder was designed to operate with a grating with a period P, but the most accurate results are generally obtained from the calibration grating section having a period FP, accordingly, it can be assumed that the measured calibration factor, F, should be used during the manufacture of the operational encoder. Specifically, the operational encoder should either use a grating with a period FP or the detector array period T should be modified to be T/F.

At this point, encoders can be manufactured in large numbers according to the invention by using scales 160 in place of the calibration scale and by using sensor heads 110 in place of the calibration sensor head. One method of constructing encoders according to the invention is to use (1) scales having gratings 162 characterized by a period of FP and (2) sensor heads having detector arrays 120 configured for measuring the phase angle of an incident fringe pattern characterized by a period T substantially equal to 2P. One problem with this approach is that the resulting period FP of the grating 162 is unlikely to be an integer number of standard length units (viz., microns or mils). Thus, for example, the grating period of such a grating might be 20.2 microns instead of a more typical 20 microns. Accordingly, a preferred approach for constructing encoders according to the invention is to use (1) gratings 162 characterized by a period of P and (2) sensor heads having detector arrays 120 configured for measuring the phase angle of an incident fringe pattern having a period substantially equal to 2P divided by the scale factor F. This latter approach is preferred because it allows any generation of sensor heads constructed according to the invention to be used interchangeably with industry standard scales.

If an index detector 140 is included in the encoder, it will be appreciated that it may also be desirable to adjust the width of the index detector elements according to the calibration scale factor. For example, it may be advantageous to make the width of the central photodetector of index detector 140 substantially equal to the period P of the grating 162 divided by the scale factor F.

Figure 11A:
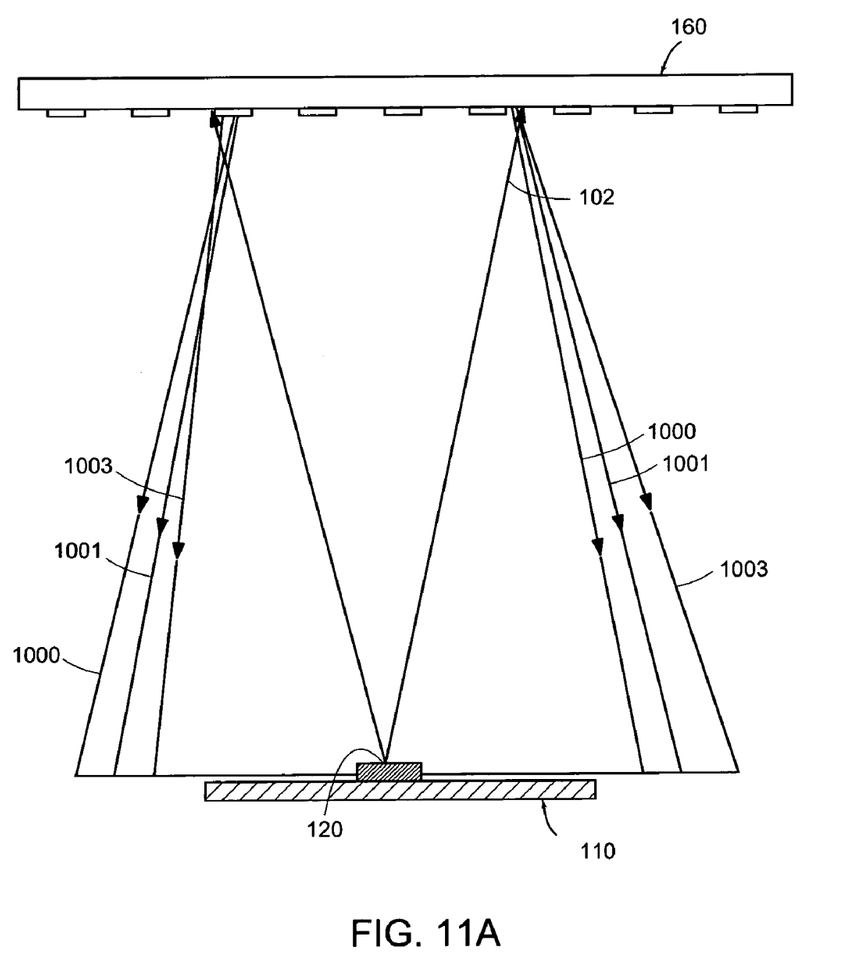
FIG. 11A shows some of the beams diffracted from the scale to the sensor head in an optical encoder constructed according to the invention.
Figure 11B:
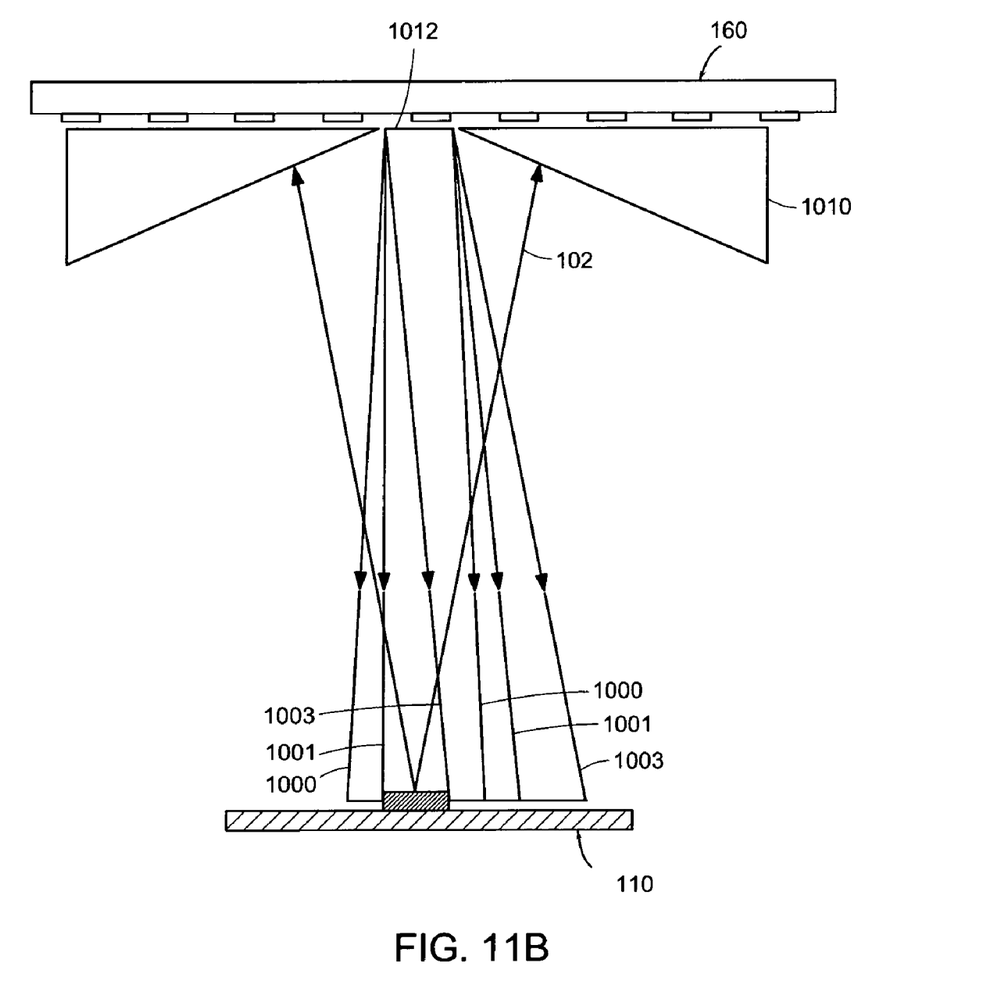
FIG. 11B shows a diffractive optical encoder constructed according to the invention that includes a mask for preventing some higher order beams from reaching the detector array.

FIGS. 11A and 11B illustrate an additional feature that may be incorporated into encoders constructed according to the invention. FIGS. 11A and 11B each show a side view of a diffractive optical encoder 100 taken from the same perspective as FIG. 2A. FIG. 11A shows the diverging cone of light 102 extending from the sensor head 110 up towards the scale 160. FIG. 11A also illustrates three beams of light that have been diffracted by grating 162 of scale 160 down towards detector array 120. Specifically, FIG. 11A shows the zeroth order beam, the left and right boundaries of which are indicated by reference characters 1000; the minus first order beam, the left and right boundaries of which are indicated by reference characters 1001; and the minus third order beam, the left and right boundaries of which are indicated by reference characters 1003. As shown, the zeroth, minus first, and minus third order beams are all incident on detector array 120. It will be appreciated that other beams (e.g., the positive first and third, as well as the positive and negative fifth order beams) are also incident on detector array 120, however, for convenience of illustration, these beams are not shown in FIG. 10A. One problem with the encoder shown in FIG. 11A is that a large number of diffracted beams are all incident on detector array 120 and the presence of these beams can degrade the quality of the resulting interference pattern that is incident on the detector array 120.

The encoder 100 shown in FIG. 11B is similar to the one shown in FIG. 11A, however, the FIG. 11B encoder additionally includes a mask 1010. As shown, the mask 1010 is disposed close to scale 160, between sensor head 110 and scale 160. Mask 1010 also defines a central aperture 1012. Mask 1010 prevents most of the light in cone 102 from reaching scale 160. That is, only light passing through aperture 1012 reaches scale 160. Mask 1010 is preferably fabricated from an absorbing material so that light incident on mask 1010 is simply absorbed and is not reflected back towards the sensor head 110. Mask 1010 advantageously restricts the angular extent of the beams that are diffracted by scale 160 back towards the sensor head 110. In the encoder illustrated in FIG. 11B, the zeroth and minus first order beams are incident on detector array 120, however, the minus third order beam is not incident on the detector array 120. It will be appreciated that if the third order beams are not incident on detector array 120, then all higher order beams will also not be incident on the detector array (i.e., the higher order beams will be displaced even more to the left or right of the detector array 120 than is the illustrated minus third order beam). Mask 1010 accordingly advantageously improves the quality of the interference pattern incident on detector array 120 by removing unwanted higher order beams. In operation, mask 1010 and sensor head 110 preferably remain fixed relative to one another, and the scale 160 is moved (to the left and right in the configuration illustrated in FIG. 11B) with respect to the sensor head 110.

As is discussed in the above-identified U.S. patent application Ser. No. 60/316,121 entitled HARMONIC SUP- PRESSING PHOTODETECTOR ARRAY, the preferred detector array is insensitive to the third order harmonic. Also, using a grating characterized by a 50-50 duty cycle prevents all even order beams from reaching the detector array 120. Accordingly, the aperture 1012 need not be so small as to insure that the third or fourth order beams do not reach the detector array. Preferably, the aperture 1012 is rectangular and the width of the aperture is just small enough to prevent the fifth order diffracted beams from reaching the detector array 120. The height of the aperture 1012 is preferably selected so that light from cone 102 can illuminate both the grating 162 and a DOE 166.

In one preferred embodiment of an encoder constructed according to the invention, the distance d between the sensor head 110 and the scale 160 is substantially equal to 4.7 mm, the light source 112 is implemented using a VCSEL, the cone angle of which is equal to about 17 degrees, the wavelength of light emitted by the VCSEL is substantially equal to 850 nm, the angle of tilt between the sensor head 110 and the scale 160 is substantially equal to 8 degrees, the period P of the grating 162 is substantially equal to 20 microns, and the detector array 120 is configured for monitoring an incident fringe pattern having a period substantially equal to 40 microns. In other preferred embodiments, a mask 1010 defining a rectangular aperture 1012 characterized by a width substantially equal to 0.4 millimeters and a height substantially equal to 1.2 millimeters is disposed between the sensor head 110 and the scale 160, and the mask 1010 is separated from the scale 160 by a distance substantially equal to 250 microns.

Several methods of constructing improved diffractive optical encoders have been disclosed. It will be appreciated that encoders may be constructed according to the invention by incorporating one or more of these methods. For example, an encoder may be constructed according to the invention that includes an index detector and does not include a mask (e.g., as shown in FIGS. 11A and 11B). Similarly, an encoder may be constructed according to the invention that includes a mask and does not include an index detector. Also, an encoder may be constructed according to the invention that includes both a mask and an index detector.

Since certain changes may be made in the above apparatus without departing from the scope of the invention herein involved, it is intended that all matter contained in the above description or shown in the accompanying drawing shall be interpreted in an illustrative and not a limiting sense.

What is claimed is:

1. An optical encoder including:
    A. a scale, the scale including an optical grating and an optical element;
    B. a sensor head, the sensor head including a light source and a detector array both of which are disposed on a substrate, the scale being disposed opposite the sensor head and being disposed for movement relative to the sensor head, a distance between the scale and a talbot imaging plane closest to the scale being equal to d, the sensor head being disposed within a region bounded by a first plane and a second plane, the first plane being separated from the scale by a distance substantially equal to n times d plus d times x, the second plane being separated from the scale by a distance substantially equal to n times d minus d times x, n being an integer and x being less than or equal to one half, the light source emitting a diverging beam of light, the diverging beam of light being directed towards the scale, light from the diverging beam of light being diffracted by the grating towards the detector array;
    C. a mask disposed between the scale and the sensor head, the mask defining an aperture, the mask remaining substantially fixed relative to the sensor head, the aperture being sized and positioned to substantially prevent fifth order beams diffracted from the grating from reaching the detector array.

2. An encoder according to claim 1, wherein the substrate defines a trench and at least one of the light source and the detector array are disposed in the trench.

3. An encoder according to claim 1, further including a spacer disposed on the substrate, at least one of the light source and the detector array being disposed on the spacer.

4. An encoder according to claim 1, wherein the index detector includes a central photodetector, a left photodetector, and a right photodetector.

5. An encoder according to claim 4, further including processing circuitry for generating a first signal, the first signal being representative of a difference between twice an output signal generated by the central photodetector minus a sum of output signals generated by the left and right photodetectors.

6. An encoder according to claim 5, the processing circuitry also generating a second signal, the second signal being representative of minus one times the first signal.

7. An encoder according to claim 6, the processing circuitry also generating an index signal, the index signal being equal to a first value when the first signal is greater than the second signal plus an offset value and the first signal being equal to a second value otherwise.

8. An encoder according to claim 4, wherein the central photodetector comprises more than one photodetector.

9. An encoder according to claim 1, wherein x is less than or equal to 0.2.

10. An encoder according to claim 1, wherein x is less than or equal to 0.1.

* * * * *